(12) United States Patent
Sengupta et al.

(10) Patent No.: US 12,423,691 B1
(45) Date of Patent: Sep. 23, 2025

(54) SYSTEMS AND METHODS FOR ISSUING BLOCKCHAIN TOKENS FOR PROPERTY RIGHTS

(71) Applicant: Wells Fargo Bank, N.A., San Francisco, CA (US)

(72) Inventors: Shuvam Sengupta, Kolkata (IN); Ramesh Babu Sarvesetty, Bangalore (IN); Rameshchandra Bhaskar Ketharaju, Hyderabad (IN); John Penacerrada, Brentwood, CA (US); Maxwell Williams, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 182 days.

(21) Appl. No.: 17/980,866

(22) Filed: Nov. 4, 2022

(51) Int. Cl.
*G06Q 20/38* (2012.01)

(52) U.S. Cl.
CPC ................ *G06Q 20/389* (2013.01)

(58) Field of Classification Search
CPC ........................................ G06Q 40/00
USPC ........................................... 705/35
See application file for complete search history.

(56) References Cited

U.S. PATENT DOCUMENTS

| | | | | |
|---|---|---|---|---|
| 5,297,032 A * | 3/1994 | Trojan | ............ | G06Q 40/04 705/37 |
| 5,761,442 A * | 6/1998 | Barr | ............ | G06Q 40/06 705/36 R |
| 5,812,988 A * | 9/1998 | Sandretto | ............ | G06Q 40/00 702/179 |
| 6,009,402 A * | 12/1999 | Whitworth | ............ | G06Q 40/08 705/400 |
| 6,014,645 A * | 1/2000 | Cunningham | ............ | G06Q 40/00 235/379 |
| 6,058,379 A * | 5/2000 | Odom | ............ | G06Q 40/04 705/37 |
| 6,313,833 B1 * | 11/2001 | Knight | ............ | G06Q 40/06 705/37 |
| 6,345,090 B1 * | 2/2002 | Walker | ............ | G06Q 40/04 379/114.03 |
| 6,954,758 B1 * | 10/2005 | O'Flaherty | ............ | G06Q 30/02 707/999.102 |

(Continued)

*Primary Examiner* — Kirsten S Apple
(74) *Attorney, Agent, or Firm* — K&L Gates LLP (57) ABSTRACT

Systems, methods, and computer program products are disclosed for issuing one or more blockchain tokens for property rights. An example method includes receiving an indication of user input including attributes of a property and, and generating a primary blockchain token, where the primary blockchain token includes metadata that correspond to the attributes of the property. The example method further includes broadcasting, over a blockchain network, a transfer of the primary blockchain token to the primary party, and generating one or more secondary blockchain tokens, where each of the one or more secondary blockchain tokens includes respective secondary metadata that correspond to unique subdivided property rights regarding the property, where the secondary metadata include a link to the primary blockchain token. The example method further includes broadcasting, over the blockchain network, transfer of the one or more secondary blockchain tokens to one or more secondary parties.

18 Claims, 3 Drawing Sheets

(56) References Cited

U.S. PATENT DOCUMENTS

| | | | | |
|---|---|---|---|---|
| 7,165,037 | B2* | 1/2007 | Lazarus | G06Q 30/0269 705/7.31 |
| 7,376,431 | B2* | 5/2008 | Niedermeyer | G07C 9/22 379/189 |
| 8,104,678 | B2* | 1/2012 | Yoshikawa | G06Q 20/4037 235/492 |
| RE43,435 | E* | 5/2012 | Krause | G06Q 40/06 705/37 |
| 8,219,482 | B2* | 7/2012 | Neri | G06Q 40/04 705/37 |
| 8,234,201 | B1* | 7/2012 | Canabarro | G06Q 40/06 705/36 R |
| 8,412,605 | B2* | 4/2013 | Griffin | G06Q 40/02 705/76 |
| 8,452,681 | B2* | 5/2013 | Clements | G06Q 40/04 705/37 |
| 8,825,456 | B2* | 9/2014 | Vasudevan | G06T 7/521 703/2 |
| 9,176,789 | B2* | 11/2015 | Lowes | G06F 9/5083 |
| 9,760,910 | B1* | 9/2017 | Tuchman | G06Q 50/01 |
| 10,958,211 | B1* | 3/2021 | Sarwat | H02J 3/004 |
| 10,977,110 | B2* | 4/2021 | Matei | G06N 5/01 |
| 11,188,977 | B2 | 11/2021 | Youb et al. | |
| 2002/0161677 | A1* | 10/2002 | Zumbach | G06Q 40/00 707/E17.001 |
| 2002/0184134 | A1* | 12/2002 | Olsen | G06Q 40/06 705/37 |
| 2003/0149648 | A1* | 8/2003 | Olsen | G06Q 40/00 705/35 |
| 2005/0187854 | A1* | 8/2005 | Cutler | G06Q 40/04 705/37 |
| 2005/0192899 | A1* | 9/2005 | Reardon | G06Q 40/00 705/40 |
| 2006/0195391 | A1* | 8/2006 | Stanelle | G06Q 40/02 705/38 |
| 2007/0244795 | A1* | 10/2007 | Lutnick | G06Q 40/04 705/37 |
| 2008/0255910 | A1* | 10/2008 | Bagchi | G06Q 10/0635 705/7.28 |
| 2008/0288326 | A1* | 11/2008 | Abramowicz | G06Q 30/0605 705/7.29 |
| 2008/0288889 | A1* | 11/2008 | Hunt | G06Q 30/02 715/810 |
| 2008/0301019 | A1* | 12/2008 | Monk | G06Q 20/4016 705/35 |
| 2009/0024539 | A1* | 1/2009 | Decker | G06Q 40/06 705/36 R |
| 2010/0023460 | A1* | 1/2010 | Hughes | G06Q 40/06 705/36 R |
| 2010/0312701 | A1* | 12/2010 | Bosch | G07F 19/20 705/43 |
| 2011/0145149 | A1* | 6/2011 | Valdes | G06Q 20/102 705/44 |
| 2011/0178912 | A1* | 7/2011 | Parsons | G06Q 40/00 705/35 |
| 2011/0213731 | A1* | 9/2011 | Cho | G06Q 50/16 705/36 R |
| 2011/0264581 | A1* | 10/2011 | Clyne | G06Q 20/10 705/39 |
| 2012/0029956 | A1* | 2/2012 | Ghosh | G06Q 10/063 705/7.11 |
| 2012/0030154 | A1* | 2/2012 | Nicholson | G01S 7/003 703/2 |
| 2012/0278254 | A1* | 11/2012 | Rosenthal | G06Q 40/06 705/36 R |
| 2012/0323764 | A1* | 12/2012 | Boberski | G06Q 40/04 705/39 |
| 2013/0024395 | A1* | 1/2013 | Clark | G06Q 40/06 705/36 R |
| 2013/0226764 | A1* | 8/2013 | Battyani | G06Q 40/04 705/37 |
| 2014/0156491 | A1* | 6/2014 | Koh | G06Q 40/04 705/37 |
| 2014/0229353 | A1* | 8/2014 | Lutnick | G06Q 40/04 705/37 |
| 2015/0154284 | A1* | 6/2015 | Pfeifer | G06F 16/3344 707/723 |
| 2016/0314425 | A1* | 10/2016 | Cunningham | G06Q 10/06398 |
| 2016/0371779 | A1* | 12/2016 | Stearns | G06Q 40/06 |
| 2018/0047071 | A1* | 2/2018 | Hsu | G06Q 30/0282 |
| 2019/0287175 | A1 | 9/2019 | Hill et al. | |
| 2019/0318348 | A1* | 10/2019 | Brenner | G06Q 50/184 |
| 2019/0370716 | A1* | 12/2019 | Kavumpurath | G06F 16/2458 |
| 2019/0379642 | A1* | 12/2019 | Simons | H04L 63/0281 |
| 2020/0019288 | A1* | 1/2020 | D'Amore | H04L 9/3239 |
| 2020/0042989 | A1 | 2/2020 | Ramadoss et al. | |
| 2020/0143367 | A1* | 5/2020 | LeBeau | G06F 21/64 |
| 2020/0175623 | A1* | 6/2020 | Howie | G06Q 50/18 |
| 2020/0267163 | A1* | 8/2020 | Wilson | H04L 9/3271 |
| 2021/0110477 | A1* | 4/2021 | Spangenberg | G06Q 20/36 |
| 2021/0241243 | A1 | 8/2021 | Wiklof et al. | |
| 2021/0264520 | A1* | 8/2021 | Cummings | G06Q 40/12 |
| 2022/0058735 | A1* | 2/2022 | Chuzhoy | G06Q 40/04 |
| 2022/0129980 | A1* | 4/2022 | Son | H04L 9/3239 |
| 2022/0309475 | A1* | 9/2022 | Kurniawan | G06F 16/248 |
| 2022/0414726 | A1* | 12/2022 | Kerber | H04L 9/50 |
| 2023/0116345 | A1* | 4/2023 | Chirochangu | G06Q 10/0635 705/7.28 |
| 2023/0298117 | A1* | 9/2023 | Barlow | G06Q 40/04 705/41 |

* cited by examiner

SYSTEMS AND METHODS FOR ISSUING BLOCKCHAIN TOKENS FOR PROPERTY RIGHTS

BACKGROUND

Blockchain technology, the use of a distributed ledger that can process transactions across a network without a single point of failure, has grown rapidly in recent years in terms of popularity and technological advancement. Blockchain technologies have seen an explosion in popularity particularly in the form of cryptocurrencies, and more recently, non-fungible tokens (NFT), a type of blockchain token.

BRIEF SUMMARY

As discussed above, blockchain technologies have exploded in popularity.

However, the full extent of applications of blockchain technology is still being explored. Proponents of blockchain posit that it could revolutionize the banking and financial services industry by cutting costs, increasing the speed and reliability of transactions, and improving the security of financial data. For example, it has been proposed that NFTs could be used to process transactions involving discrete properties, such as real estate, mineral or water rights, or certain securities. In particular, transactions of certain properties can incur additional costs and difficulties, for example the necessity of performing title searches for real estate transactions. Certain properties may be subdivided, requiring additional transaction costs to rent or confer these property rights to other parties. The costs and administrative difficulties involved in creating these subdivisions may deter certain property owners from exercising such options.

However, several challenges must first be overcome before the widespread use of blockchain technology is capable of offering measurable benefits to banking and financial services. One obstacle to the adoption of NFTs for representing ownership of discrete properties is the inability to subdivide or subcontract certain rights regarding the property to other parties. NFTs do not inherently have any mechanism for subdividing, linking to, or otherwise depending on other tokens. Furthermore, NFTs do not inherently have a mechanism for representing time-limited property agreements, such as renting. Since NFTs are recorded on a distributed ledger, a record of the NFT generally persists as long as the distributed ledger network remains intact.

In contrast, example embodiments described herein enable the subdivision of property rights using blockchain tokens. More specifically, example embodiments receive user input specifying attributes of a property and a party possessing rights to the property. Example embodiments also issue primary and secondary blockchain tokens where the primary blockchain token is connected with rights to a property and the secondary blockchain tokens are connected with subdivisions of the property. These secondary blockchain tokens are linked, upon generation, to the primary blockchain token. Furthermore, example embodiments broadcast transactions of the primary and secondary blockchain tokens over a blockchain network, causing the transaction to be recorded in blocks and thus effect the transactions.

Accordingly, the present disclosure sets forth systems, methods, and apparatuses that enable the use of NFTs to represent ownership of subdivided properties. There are many advantages of these and other embodiments described herein. For instance, example embodiments reduce costs and complexities involved in creating contracts or deeds for subdivided properties. The use of blockchain tokens to track ownership of the primary property and its subdivisions eliminates potential ambiguity as to the identity of the owner and brings improvements associated with blockchain technology to the field of financial services. In addition, example embodiments provide improvements to security for transactions involving subdivided property. The distributed ledger provides redundancy and eliminates a single point of failure that may be exploited by an attacker. Consensus methods for nodes on the distributed ledger may stipulate that an attacker must gain control of a large share, for example "50% plus one" of the nodes, to successfully attack the distributed ledger. Finally, example embodiments may optionally integrate into larger distributed ledger systems. By integrating into larger blockchains, other new blockchain technologies may exploit the use of blockchain tokens to represent subdivided property rights, avoiding the need to create and maintain separate networks and allowing subdivided property transactions to leverage new advancements in blockchain technology.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "block" refers to a data structure associated with a blockchain. For example, a block may comprise a model definition data structure, a block header data structure, a technical data structure, a business data structure, an operational data structure, a next block information data structure, any other suitable electronic information or data structure associated therewith (including, but not limited to, links or pointers), or any combination thereof. A block header data structure may comprise a current block hash value data structure, a previous block hash value data structure, a next block hash value data structure, a Merkle root hash value data structure, a nonce value data structure, any other suitable electronic information or data structure associated therewith (including, but not limited to, links or pointers), or any combination thereof.

The term "blockchain" refers to a digital ledger comprising a growing list of blocks. For example, a blockchain may comprise a plurality of blocks, any other suitable electronic information or data structure associated therewith (including, but not limited to, links or pointers), or any combination thereof.

The term "node device" or "node" refers to a computing device, such as a server device, client device, a database server device, a data storage device, or a blockchain data storage device that stores one or more portions of a blockchain. For example, a node device may comprise a server device, a client device, a database, a database server device, any other suitable device or data structure associated therewith (including, but not limited to, links or pointers), or any combination thereof.

The term "smart contract" refers to any code usable to perform changes in a blockchain or to carry some process in the blockchain. For example, a smart contract may comprise one or more blockchain-based data structures that digitally facilitate, verify, or enforce the negotiation or performance of a contract.

The term "blockchain token" refers to a record on a blockchain that may be transferred or traded, and typically comprises unique metadata. Blockchain tokens may be associated with a particular asset, either digital or physical. Blockchain tokens may be unique, and may include assets known as non-fungible tokens (NFT). A blockchain token may comprise a metadata structure, containing information such as the date and time of the token's creation, a name and description of the blockchain token, and links or other data relating the blockchain token to an asset. Possession of the blockchain token or NFT may confer ownership rights over the asset linked to the blockchain token.

The term "sidechain" refers to a secondary blockchain that operates in parallel to a primary blockchain. The sidechain may set different standards for consensus, recordkeeping, or other properties of the sidechain that are distinct from those of the primary blockchain. For example, a sidechain may have a lower transaction cost and faster transaction times due to a less difficult consensus requirement, or faster block times, trading off faster transactions for reduced security. Sidechains may also be permissioned, allowing an entity or consortium to manage a sidechain while still maintaining a connection to the primary blockchain. Sidechains also permit assets on the sidechain to move to and from the main chain when needed, typically by means of a two-way bridge between the two blockchains, where predetermined rules for exchange between the two blockchains are established.

System Architecture

Figure 1:
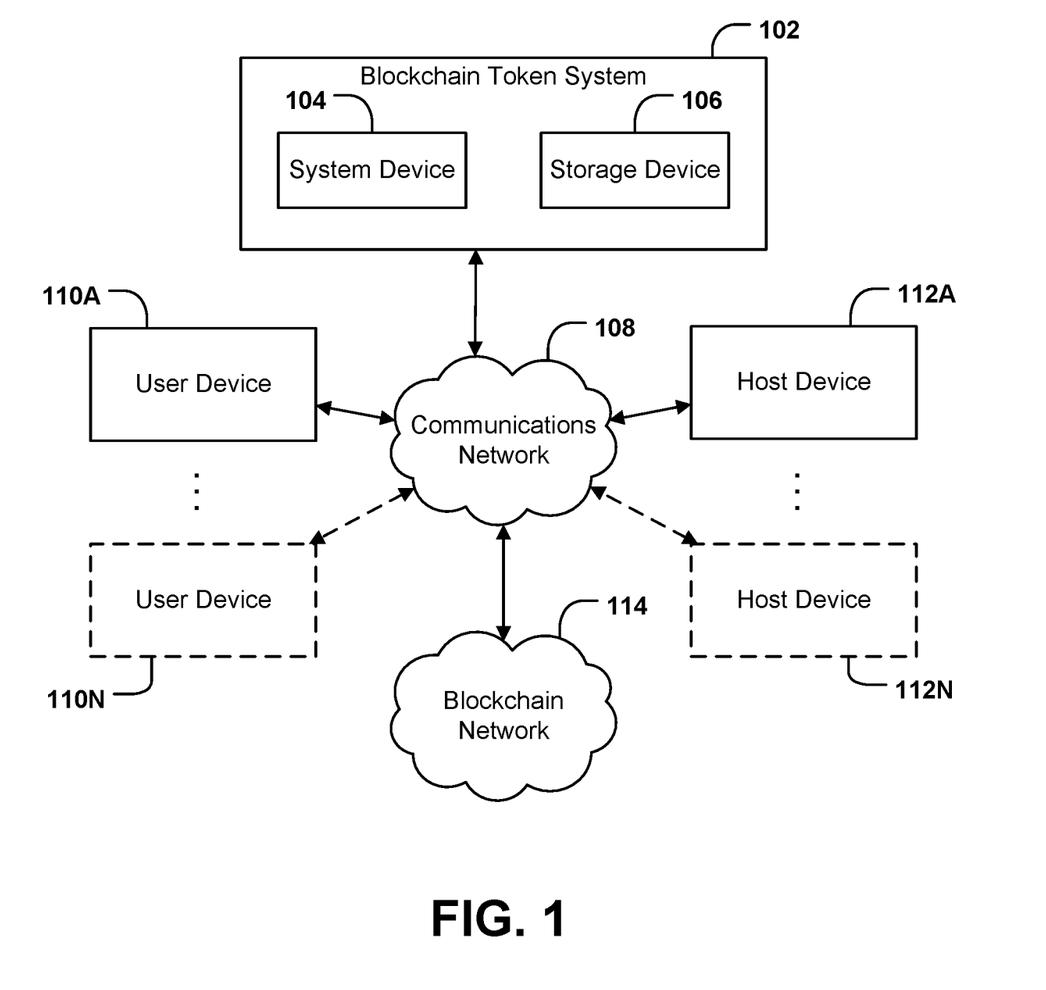
FIG. 1 illustrates a system in which some example embodiments may be used for issuing blockchain tokens for property rights, in accordance with some example embodiments described herein.

Example embodiments described herein may be implemented using any of a variety of computing devices or servers. To this end, FIG. 1 illustrates an example environment within which various embodiments may operate. As illustrated, a blockchain token system 102 may include a system device 104 in communication with a storage device 106. Although system device 104 and storage device 106 are described in singular form, some embodiments may utilize more than one system device 104 and/or more than one storage device 106. Additionally, some embodiments of the blockchain token system 102 may not require a storage device 106 at all. Whatever the implementation, the blockchain token system 102, and its constituent system device 104 and/or storage device 106 may receive and/or transmit information via communications network 108 (e.g., the Internet) with any number of other devices, such as one or more of user device 110A through user device 110N and/or host device 112A through host device 112N. The blockchain token system 102 may also communicate with a separate blockchain network 114 via the communications network 108.

The system device 104 may be implemented as one or more servers, which may or may not be physically proximate to other components of the blockchain token system 102. Furthermore, some components of system device 104 may be physically proximate to the other components of the blockchain token system 102 while other components are not. The system device 104 may receive, process, generate, and transmit data, signals, and electronic information to facilitate the operations of the blockchain token system 102. Particular components of system device 104 are described in greater detail below with reference to apparatus 200 in connection with FIG. 2.

The storage device 106 may comprise a distinct component from system device 104, or may comprise an element of system device 104 (e.g., memory 204, as described below in connection with FIG. 2). The storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). The storage device 106 may host the software executed to operate the blockchain token system 102. The storage device 106 may store information relied upon during operation of the blockchain token system 102, such as various metadata that may be used by the blockchain token system 102, data and documents to be analyzed using the blockchain token system 102, or the like. In addition, the storage device 106 may store control signals, device characteristics, and access credentials enabling interaction between the blockchain token system 102 and one or more of the user device 110A-110N or host device 112A-112N.

The one or more user device 110A-110N may be embodied by any storage devices known in the art. Similarly, the one or more host device 112A-112N may be embodied by any computing devices known in the art, such as desktop or laptop computers, tablet devices, smartphones, or the like. The one or more user device 110A-110N and the one or more host device 112A-112N need not themselves be independent devices, but may be peripheral devices communicatively coupled to other computing devices.

The blockchain network 114 is a collection of networked node devices of a blockchain, which may be permissionless (public), or permissioned (private). The blockchain network 114 may use any distributed ledger or blockchain technology that is capable of creating and exchanging blockchain tokens or NFTs. In some embodiments, the blockchain network 114 may allow for Turing-complete scripting of contracts, known also as smart contracts, to be executed on the blockchain. The blockchain network 114 may be related to other blockchain networks not pictured here. For example, the blockchain network 114 may be a sidechain of another blockchain network, or another network (not shown) may form a sidechain of the blockchain network 114. The nodes may be embodied by specialized node devices, or may be embodied by any computing devices or server devices known in the art. In some embodiments the blockchain token system 102 itself may be a node of the blockchain network 114, or the blockchain token system 102 may be external to the blockchain.

Although FIG. 1 illustrates an environment and implementation in which the blockchain token system 102 interacts with one or more of user device 110A-110N and/or host device 112A-112N, in some embodiments users may directly interact with the blockchain token system 102 (e.g., via communications hardware 206 of system device 104), in which case a separate user device 110 may not be utilized. Whether by way of direct interaction or via a separate user device 110, a user may communicate with, operate, control, modify, or otherwise interact with the blockchain token system 102 to perform the various functions and achieve the various benefits described herein.

Example Implementing Apparatuses

Figure 2:
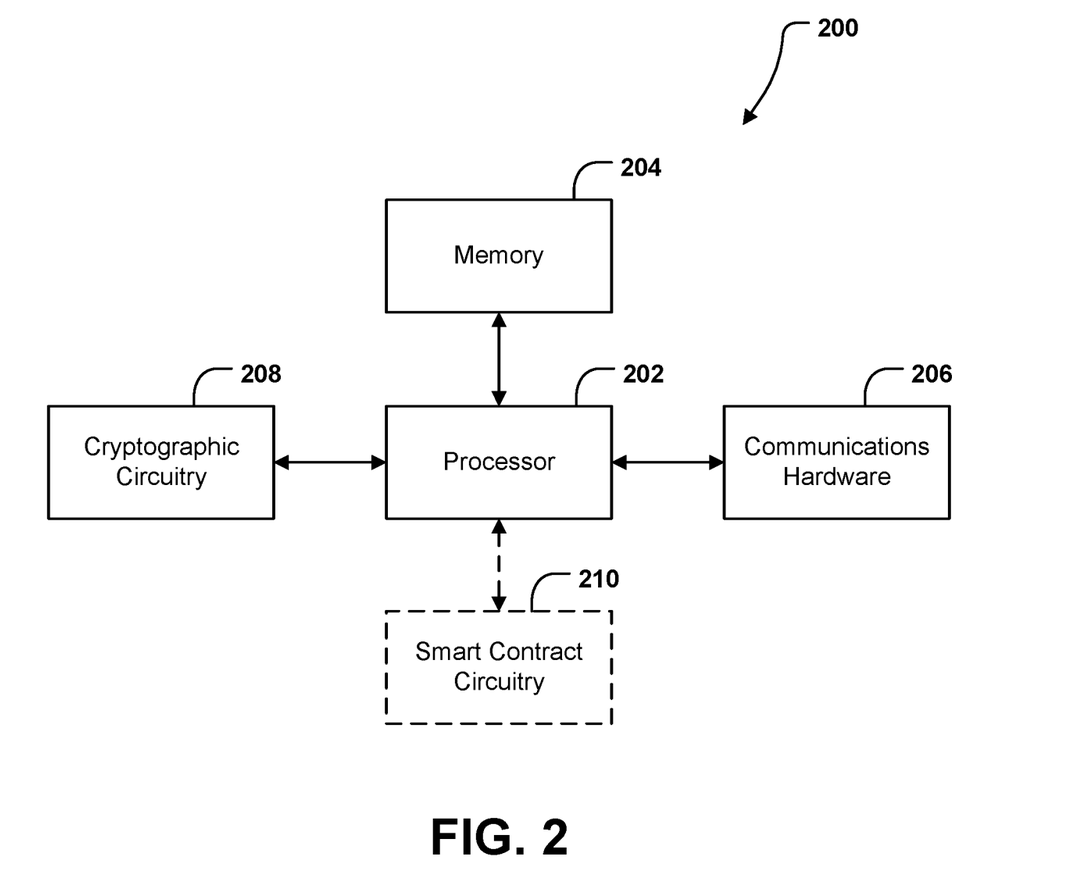
FIG. 2 illustrates a schematic block diagram of example circuitry embodying a device that may perform various operations in accordance with some example embodiments described herein.

The system device 104 of the blockchain token system 102 (described previously with reference to FIG. 1) may be embodied by one or more computing devices or servers, shown as apparatus 200 in FIG. 2. As illustrated in FIG. 2, the apparatus 200 may include processor 202, memory 204, communications hardware 206, cryptographic circuitry 208, and smart contract circuitry 210 each of which will be described in greater detail below. While the various components are only illustrated in FIG. 2 as being connected with processor 202, it will be understood that the apparatus 200 may further comprise a bus (not expressly shown in FIG. 2) for passing information amongst any combination of the various components of the apparatus 200. The apparatus 200 may be configured to execute various operations described above in connection with FIG. 1 and below in connection with FIG. 3.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 202 represents an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

The memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may be configured to provide output to a user and, in some embodiments, to receive an indication of user input. It will be noted that some embodiments will not include such configurations, in which case user input may be received via a separate device such as a user device 110A-110N (shown in FIG. 1). The communications hardware 206 may comprise a user interface, such as a display, and may further comprise the components that govern use of the user interface, such as a web browser, mobile application, dedicated client device, or the like. In some embodiments, the communications hardware 206 may include input-output circuitry coupled to a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a cryptographic circuitry 208 that performs cryptographic operations for the distributed ledger. The cryptographic circuitry 208 may utilize processor 202, memory 204, or any other hardware component included in the apparatus 200 to perform these operations, as described in connection with FIG. 3 below. The cryptographic circuitry 208 may further utilize communications hardware 206 to gather data from a variety of sources (e.g., user device 110A through user device 110N or storage device 106, as shown in FIG. 1) or to receive data from a user, and in some embodiments may utilize processor 202 and/or memory 204 to perform cryptographic operations.

Finally, the apparatus 200 may also comprise a smart contract circuitry 210 that creates smart contracts on the blockchain. The smart contract circuitry 210 may utilize processor 202, memory 204, or any other hardware component included in the apparatus 200 to perform these operations, as described in connection with FIG. 3 below. The smart contract circuitry 210 may further utilize communications hardware 206 to gather data from a variety of sources (e.g., user device 110A through user device 110N or storage device 106, as shown in FIG. 1) or to receive data from a user, and in some embodiments may utilize processor 202 and/or memory 204 to create smart contracts.

Although components of FIG. 2 are described in part using functional language, it will be understood that the particular implementations necessarily include the use of particular hardware. It should also be understood that certain of these components of FIG. 2 may include similar or common hardware. For example, the cryptographic circuitry 208 and smart contract circuitry 210 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the term "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 200 to perform the various functions described herein.

Although the cryptographic circuitry 208 and smart contract circuitry 210 may leverage processor 202, memory 204, or communications hardware 206, as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), memory 204, or communications hardware 206 for enabling any functions not performed by special-purpose hardware elements. In all embodiments, however, it will be understood that the cryptographic circuitry 208 and smart contract circuitry 210 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. Thus, some or all of the functionality described herein may be provided by third party circuitry. For example, a given apparatus 200 may access one or more third party circuitries via any sort of networked connection that facilitates transmission of data and electronic information between the apparatus 200 and the third party circuitries. In turn, that apparatus 200 may be in remote communication with one or more of the other components described above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of flowcharts.

Example Operations

Figure 3:
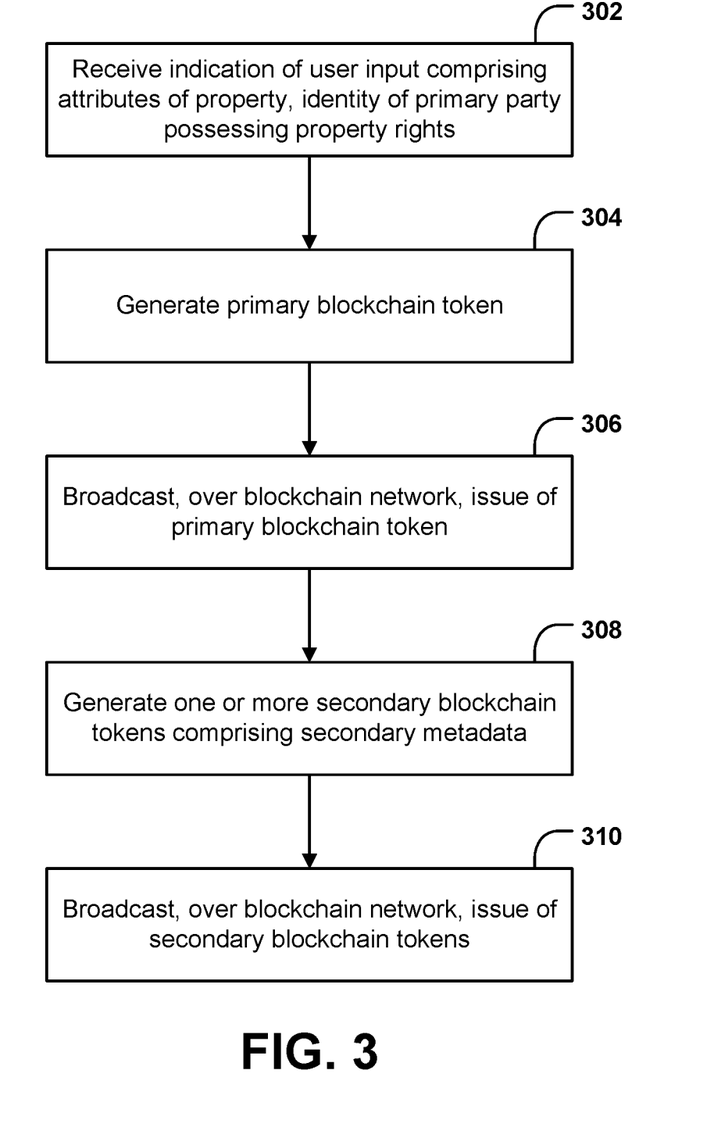
FIG. 3 illustrates an example flowchart for issuing blockchain tokens for property rights, in accordance with some example embodiments described herein.

Turning to FIG. 3, example flowcharts are illustrated that contain example operations implemented by example embodiments described herein. The operations illustrated in FIG. 3 may, for example, be performed by system device 104 of the blockchain token system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, cryptographic circuitry 208, smart contract circuitry 210, and/or any combination thereof. It will be understood that user interaction with the blockchain token system 102 may occur directly via communications hardware 206, or may instead be facilitated by a separate user device (e.g. user device 110A-110N), as shown in FIG. 1, and which may have similar or equivalent physical componentry facilitating such user interaction.

Turning to FIG. 3, example operations are shown for issuing blockchain tokens for property rights.

As shown by operation 302, the apparatus 200 includes means, such as processor 202, communications hardware 206, or the like, for receiving an indication of user input comprising attributes of a property and an identity of a primary party possessing the property rights. The user input may be received via the communications hardware 206 directly by the blockchain token system 102, or from one of user device 110A-110N over communications network 108. The processor 202 may interpret the user input to determine the attributes of the property and the identity of the primary party possessing the property rights. The attributes of the property may depend on the nature of the property. For example, a physical property such as real estate may have attributes such as the property address, floor area of a structure on the property, construction date of the property, and/or zoning information about the property. As another example, a financial asset property may have attributes such as the maturity date of bonds or loans, identification of any business or government entity issuing the financial asset, interest rates, or identity of other bundled assets if the financial asset is a pool of assets. The identity of the primary party possessing the property rights may be an identifier, username, public key, or other information uniquely identifying the party possessing the property rights. The party may be an individual or a group. The identity may link the party to a cryptocurrency wallet, which comprises the party's cryptographic keys, allowing the party to receive transactions on the blockchain.

As shown by operation 304, the apparatus 200 includes means, such as communications hardware 206, cryptographic circuitry 208, or the like, for generating a primary blockchain token. The primary blockchain token comprises primary metadata that correspond to the attributes of the property. The cryptographic circuitry 208 may generate the primary blockchain token by generating primary metadata, generating or locating a contract, and/or generating other blockchain token data. The primary metadata may correspond to the attributes received from user input during operation 302. The contract may comprise computer instructions that define the parameters of the blockchain token. For example, the contract may permit the blockchain token to adhere to a published standard for blockchain tokens. The contract may track the total number of instances of the blockchain token, or blockchain tokens of the same series. In some embodiments, the contract may also be referred to as a smart contract which may utilize smart contract circuitry 210, indicating further functionality of the contract, for example performing specified actions upon transfer of the blockchain token. The contract may be generated by the cryptographic circuitry 208 and deployed to the blockchain network 114 via the communications hardware 206, or the contract may already exist on the blockchain network 114 and be utilized by the cryptographic circuitry 208 to generate the primary blockchain token. The cryptographic circuitry 208 may generate the primary blockchain token by supplying the primary metadata and/or other blockchain token data to the deployed contract. The process of generating the primary blockchain token may also be referred to as "minting," and in some embodiments, may be associated with a transaction cost. The transaction cost may correspond to computational power required to validate the transaction or generation of the primary blockchain token, and may be paid by the blockchain token issuer, or entity generating the primary blockchain token.

As shown by operation 306, the apparatus 200 includes means, such as communications hardware 206, cryptographic circuitry 208 or the like, for broadcasting, over a blockchain network, a transfer of the primary blockchain token to the primary party possessing the property rights. The transfer of the primary blockchain token is digitally signed by a token issuer. The communications hardware 206 may broadcast the transfer over blockchain network 114 to cause the transaction to take effect on the blockchain. Broadcasting the transaction may enable nodes of the blockchain to validate the transaction and record it in a new block. The cryptographic circuitry 208 may digitally sign the broadcast using the signature of the token issuer to prove that the entity in possession of the primary blockchain token is the same as the entity initiating the transaction. The digital signing of the broadcast may use the token issuer's private key, and may utilize a cryptocurrency wallet or other applications to cause the signing. The transfer may be directed to the primary party possessing the property rights, who may be identified using the identification information provided by user input in operation 302. In some embodiments, the transfer of the primary blockchain token may occur in the same operation as the generation of the primary blockchain token, or the primary blockchain token may immediately be possessed by the primary party upon being generated. In some embodiments, the generation of the primary blockchain token may be a distinct step and a separate broadcast from the transfer of the primary blockchain token to the primary party.

As shown by operation 308, the apparatus 200 includes means, such as cryptographic circuitry 208, or the like, for generating one or more secondary blockchain tokens. Each of the one or more secondary blockchain tokens comprises respective secondary metadata that correspond to unique subdivided property rights regarding the property. The secondary metadata comprise a link to the primary blockchain token. The cryptographic circuitry 208 may generate the one or more secondary blockchain tokens using the same procedure as operation 304. The secondary blockchain tokens may utilize a secondary contract, secondary metadata, and/or other blockchain token data. The secondary contract may be distinct from the contract used to generate the primary blockchain token, or may apply a secondary functionality of the same contract. The secondary metadata may comprise similar attributes as the primary metadata and may also comprise a link to the primary blockchain token. The link may be a hash of the primary blockchain token, a unique identifier, or the like. The secondary metadata may also comprise unique subdivided property rights regarding the property. For example, if the property is a physical property, such as real estate, the subdivided property rights may correspond to rooms within a residence, offices within an office building, or the like. As a further example, if the property is a financial asset, subdivided property rights may be bundled assets underlying a pool of assets.

In some embodiments, the property rights are types of ownership of a real estate property, and the unique subdivided property rights correspond to subdivided units of the real estate property. For example, the primary party may wish to allow secondary parties to rent discrete units of the real estate property, such as office space in an office building, apartments in an apartment building, or rooms in a house. The primary blockchain token may represent ownership of the real estate property, while the secondary blockchain tokens may represent property rights to the subdivided units, such as offices, apartments, or rooms. The subdivided property rights may be rental rights, or may be permanent rights to the units of subdivided property.

In some embodiments, the secondary metadata further comprise a duration of time for which the unique subdivided property rights are in effect. By way of continued example, the primary party may wish to rent discrete parts of the property. The cryptographic circuitry 208 may encode metadata specifying the duration of the rental contract, which gives indication of the duration of time for which the secondary blockchain token and unique subdivided property rights are in effect. The duration of time may be entered as an additional piece of metadata in the secondary metadata. The duration of time may be encoded as a time of expiration for the subdivided property rights.

In some embodiments, the apparatus 200 may include means, such as communications hardware 206, cryptographic circuitry 208, or the like, for automatically causing expiration of the one or more secondary blockchain tokens upon passage (e.g., expiration) of the duration of time for which the unique subdivided property rights are in effect. The cryptographic circuitry 208 may detect that the duration of time for which the unique subdivided property rights are in effect elapsed, and may cause the expiration of the secondary blockchain tokens. The mechanism for causing the expiration of the secondary blockchain tokens may depend on the embodiment and the type of blockchain technology utilized. For example, the communications hardware 206 may cause the secondary blockchain tokens to be transferred to a null address, a destination that is not owned by any user, in a process called "coin burning." Since no user owns or may access the null address, the secondary blockchain tokens are removed from circulation and effectively expired. In some embodiments, the cryptographic circuitry 208 may implement the secondary blockchain tokens in such a way that no additional action is needed by circuitry of the blockchain token system 102, and the secondary blockchain tokens are automatically expired after the specified duration of time has elapsed.

In some embodiments, the apparatus 200 may include means, such as smart contract circuitry 210, or the like, for encoding a procedure for subsequent transfer of the property rights and the unique subdivided property rights in a smart contract. The primary blockchain token may further comprise the smart contract. In some embodiments, the technology of the primary blockchain may permit users to associate smart contracts to blockchain tokens. The smart contract circuitry 210 may deploy the smart contract encoding the procedure for subsequent transfer of the property rights and the unique subdivided property rights. The smart contract may be associated with the primary blockchain token, the secondary blockchain tokens, or the same smart contract may be associated with both the primary blockchain token and the secondary blockchain tokens. The subsequent transfer of rights encoded in the smart contract may describe, for example, the return of rented property rights at the end of a rental period or the inheritance of property rights upon death.

In some embodiments, the apparatus 200 may include means, such as smart contract circuitry 210, or the like, for, in an instance in which the property rights or the unique subdivided property rights are transferred, causing execution of the smart contract. The smart contract circuitry 210 may cause execution of the smart contract when certain conditions specified in the smart contract are satisfied. For example, the conditions of the smart contract may relate to the subsequent transfer of property rights or the subsequent transfer of unique subdivided property rights. The subsequent transfer of these rights may be linked to the smart contract circuitry 210, which may in turn trigger execution of the smart contract to cause an update of the primary and/or secondary blockchain tokens to reflect the subsequent transfer of property rights.

For example, a trusted organization such as a bank may validate the sale of a real estate property, and a signed or verified message from the trusted organization may cause the smart contract circuitry 210 to activate the smart contract associated to the blockchain token associated to the real estate property. In another example, a real estate property owner may digitally sign a contract subdividing a property into several rental units. Receiving the digitally signed contract may cause the smart contract circuitry 210 to activate the smart contract, which in turn may automatically generate one or more secondary blockchain tokens linked to the primary blockchain token.

As shown by operation 310, the apparatus 200 includes means, such as communications hardware 206, cryptographic circuitry 208, or the like, for broadcasting, over the blockchain network, a secondary transfer of the one or more secondary blockchain tokens to one or more secondary parties. The secondary transfer of the one or more secondary blockchain tokens is digitally signed by a secondary token issuer. The communications hardware 206 may broadcast the secondary transfer of the secondary blockchain tokens to the one or more secondary parties in a manner similar to that of operation 306. The secondary broadcast may occur over blockchain network 114 to cause the transaction to take effect on the blockchain. Broadcasting the transaction may enable nodes of the blockchain to validate the transaction and record it in a new block. The cryptographic circuitry 208 may digitally sign the broadcast using the signature of the secondary token issuer to prove that the entity in possession of the primary blockchain token is the same as the entity initiating the transaction.

In some embodiments, the digital signing of the broadcast may use the secondary token issuer's private key, and may utilize a cryptocurrency wallet or other applications to cause the signing. The secondary token issuer may, in some embodiments, be the same as the token issuer of the primary blockchain token. In some embodiments, the secondary token issuer may be the primary party. The secondary transfer may be directed to the one or more secondary parties possessing the subdivided property rights. In some embodiments, the secondary transfer of the one or more secondary blockchain tokens may occur in the same operation as the generation of the one or more secondary blockchain tokens, or the one or more secondary blockchain tokens may immediately be possessed by the one or more secondary parties upon being generated. In some embodiments, the generation of the one or more secondary blockchain tokens may be a distinct step and a separate broadcast from the transfer of the one or more secondary blockchain tokens to the one or more secondary parties.

In some embodiments, the blockchain network is managed by a consortium comprising one or more entities. The blockchain network managed by the consortium may also be referred to as a private blockchain or permissioned blockchain. In the permissioned blockchain, the consortium may have the authority to take actions such as allowing or disallowing certain users, deciding if and how new tokens and/or currency are generated, and deciding how the distributed ledger is maintained in blocks. The consortium may be able to, in effect, permit or allow any particular transaction on the permissioned blockchain. The entities making up the consortium may be one or more banks, other companies, or government entities that are trusted to make decisions about the transfer of property rights.

In some embodiments, the apparatus 200 may include means, such as processor 202, memory 204, communications hardware 206, cryptographic circuitry 208, smart contract circuitry 210, or the like, for, in an instance in which the property rights are transferred, generating a sidechain of the blockchain network. The sidechain may comprise records of the secondary transfer of the one or more secondary blockchain tokens. The cryptographic circuitry 208 may initialize the sidechain by determining properties of the sidechain such as the block size, block timing, consensus methods, and/or the like. The communications hardware 206 may broadcast the initialization of the sidechain to the blockchain network 114 to effect the creation of the sidechain on one or more nodes. The nodes of the sidechain may be a subset of the nodes of the primary blockchain network, or may be a distinct set of nodes. The sidechain may record transactions involving the one or more secondary blockchain tokens, including the initial secondary transfer as well as subsequent transfers of the secondary blockchain tokens. In an embodiment where the blockchain token system 102 is configured as a node of the blockchain network 114, the blockchain token system 102 may further act as a bridge between the main blockchain and the sidechain.

As described above, example embodiments provide methods and apparatuses that enable improved subdivision of property rights with blockchain tokens. Example embodiments thus overcome the issues associated with representing property rights with blockchain tokens by generating secondary blockchain tokens comprising secondary metadata. For example, the secondary metadata creates a link to the primary blockchain token recorded on the blockchain to validate the connection between the property and the subdivided property. By broadcasting the issuance of the secondary blockchain tokens, example embodiments create a secure, redundant distributed ledger that overcomes the limitations of individual written contracts between the owner of the property and holders of subdivided property rights.

FIG. 3 illustrates operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for issuing one or more blockchain tokens for property rights, the method comprising:
   receiving, by communications hardware, an indication of user input comprising attributes of a property and an identity of a primary party possessing the property rights;
   generating, by cryptographic circuitry, a primary blockchain token, wherein the primary blockchain token comprises primary metadata that correspond to the attributes of the property;
   broadcasting, by the communications hardware and over a blockchain network, a transfer of the primary blockchain token to the primary party possessing the property rights, wherein the transfer of the primary blockchain token is digitally signed by a token issuer;
   generating, by the cryptographic circuitry, one or more secondary blockchain tokens, wherein each of the one or more secondary blockchain tokens comprises respective secondary metadata that correspond to unique subdivided property rights regarding the property, wherein the secondary metadata comprise a link to the primary blockchain token, wherein the secondary metadata further comprise a duration of time for which the unique subdivided property rights are in effect, wherein the unique subdivided property rights comprise a rental agreement facilitated by a smart contract;
   broadcasting, by the communications hardware and over the blockchain network, a secondary transfer of the one or more secondary blockchain tokens to one or more secondary parties, wherein the secondary transfer of the one or more secondary blockchain tokens is digitally signed by a secondary token issuer;
   automatically causing, by the cryptographic circuitry, an expiration of the one or more secondary blockchain tokens upon passage of the duration of time for which the unique subdivided property rights are in effect, by:
      modifying the one or more secondary blockchain tokens so that secondary metadata include expiration data, and
      prohibiting issuing the unique subdivided property rights using the same one or more secondary blockchain tokens based on presence of the expiration data; and
   upon the expiration of the one or more secondary blockchain tokens, broadcasting, by the communications hardware and over the blockchain network, a subsequent transfer of the unique subdivided property rights to the primary party.

2. The method of claim 1, further comprising:
encoding, by smart contract circuitry, a procedure for a subsequent transfer of the property rights and the subsequent transfer of the unique subdivided property rights in a smart contract, wherein the primary blockchain token utilizes the smart contract.

3. The method of claim 2, further comprising:
in an instance in which the property rights or the unique subdivided property rights are transferred, causing execution, by the smart contract circuitry, of the smart contract.

4. The method of claim 1, wherein the property rights are types of ownership of a real estate property, and wherein the unique subdivided property rights correspond to subdivided units of the real estate property.

5. The method of claim 1, wherein the blockchain network is managed by a consortium comprising one or more entities.

6. The method of claim 1, further comprising:
in an instance in which the property rights are transferred, generating, by the cryptographic circuitry, a sidechain of the blockchain network, wherein the sidechain comprises records of the secondary transfer of the one or more secondary blockchain tokens.

7. An apparatus for issuing one or more blockchain tokens for property rights, the apparatus comprising:
communications hardware configured to:
receive an indication of user input comprising attributes of a property and an identity of a primary party possessing the property rights;
cryptographic circuitry configured to:
generate a primary blockchain token, wherein the primary blockchain token comprises primary metadata that correspond to the attributes of the property;
wherein the communications hardware is further configured to:
broadcast, over a blockchain network, a transfer of the primary blockchain token to the primary party possessing the property rights, wherein the transfer of the primary blockchain token is digitally signed by a token issuer;
wherein the cryptographic circuitry is further configured to:
generate one or more secondary blockchain tokens, wherein each of the one or more secondary blockchain tokens comprises respective secondary metadata that correspond to unique subdivided property rights regarding the property, wherein the secondary metadata comprise a link to the primary blockchain token, wherein the secondary metadata further comprise a duration of time for which the unique subdivided property rights are in effect, wherein the unique subdivided property rights comprise a rental agreement facilitated by a smart contract; and
wherein the communications hardware is further configured to:
broadcast, over the blockchain network, a secondary transfer of the one or more secondary blockchain tokens to one or more secondary parties, wherein the secondary transfer of the one or more secondary blockchain tokens is digitally signed by a secondary token issuer;
automatically cause an expiration of the one or more secondary blockchain tokens upon passage of the duration of time for which the unique subdivided property rights are in effect, by:
modifying the one or more secondary blockchain tokens so that secondary metadata include expiration data; and
prohibiting issuing the unique subdivided property rights using the same one or more secondary blockchain tokens based on presence of the expiration data, and
upon the expiration of the one or more secondary blockchain tokens,
broadcasting, over the blockchain network, a subsequent transfer of the unique subdivided property rights to the primary party.

8. The apparatus of claim 7, further comprising:
smart contract circuitry configured to:
encode a procedure for a subsequent transfer of the property rights and the subsequent transfer of the unique subdivided property rights in a smart contract,
wherein the primary blockchain token utilizes the smart contract.

9. The apparatus of claim 8, wherein the smart contract circuitry is further configured to:
in an instance in which the property rights or the unique subdivided property rights are transferred, cause execution of the smart contract.

10. The apparatus of claim 7, wherein the property rights are types of ownership of a real estate property, and wherein the unique subdivided property rights correspond to subdivided units of the real estate property.

11. The apparatus of claim 7, wherein the blockchain network is managed by a consortium comprising one or more entities.

12. The apparatus of claim 7, wherein the cryptographic circuitry is further configured to:
in an instance in which the property rights are transferred, generate a sidechain of the blockchain network, wherein the sidechain comprises records of the secondary transfer of the one or more secondary blockchain tokens.

13. A computer program product for issuing one or more blockchain tokens for property rights, the computer program product comprising at least one non-transitory computer-readable storage medium storing software instructions that, when executed, cause an apparatus to:
receive an indication of user input comprising attributes of a property and an identity of a primary party possessing the property rights;
generate a primary blockchain token, wherein the primary blockchain token comprises primary metadata that correspond to the attributes of the property;
broadcast, over a blockchain network, a transfer of the primary blockchain token to the primary party possessing the property rights, wherein the transfer of the primary blockchain token is digitally signed by a token issuer;
generate one or more secondary blockchain tokens, wherein each of the one or more secondary blockchain tokens comprises respective secondary metadata that correspond to unique subdivided property rights regarding the property, wherein the secondary metadata comprise a link to the primary blockchain token, wherein the secondary metadata further comprise a duration of time for which the unique subdivided property rights are in effect, wherein the unique subdivided property rights comprise a rental agreement facilitated by a smart contract;

broadcast, over the blockchain network, a secondary transfer of the one or more secondary blockchain tokens to one or more secondary parties, wherein the secondary transfer of the one or more secondary blockchain tokens is digitally signed by a secondary token issuer;

automatically cause an expiration of the one or more secondary blockchain tokens upon passage of the duration of time for which the unique subdivided property rights are in effect, by:

modifying the one or more secondary blockchain tokens so that secondary metadata include expiration data, and prohibiting issuing the unique subdivided property rights using the same one or more secondary blockchain tokens based on presence of the expiration data; and upon the expiration of the one or more secondary blockchain tokens, broadcast, over the blockchain network, a subsequent transfer of the unique subdivided property rights to the primary party.

14. The computer program product of claim 13, wherein the software instructions, when executed, further cause the apparatus to:

encode a procedure for a subsequent transfer of the property rights and the subsequent transfer of the unique subdivided property rights in a smart contract, wherein the primary blockchain token further comprises the smart contract.

15. The computer program product of claim 14, wherein the software instructions, when executed, further cause the apparatus to:

in an instance in which the property rights or the unique subdivided property rights are transferred, cause execution of the smart contract.

16. The computer program product of claim 13, wherein the property rights are types of ownership of a real estate property, and wherein the unique subdivided property rights correspond to subdivided units of the real estate property.

17. The computer program product of claim 13, wherein the blockchain network is managed by a consortium comprising one or more entities.

18. The computer program product of claim 13, wherein the software instructions, when executed, further cause the apparatus to:

in an instance in which the property rights are transferred, generate a sidechain of the blockchain network, wherein the sidechain comprises records of the secondary transfer of the one or more secondary blockchain tokens.

* * * * *